(12) United States Patent
Wang et al.

(10) Patent No.: US 10,129,183 B2
(45) Date of Patent: Nov. 13, 2018

(54) CONNECTION APPARATUS AND CONNECTION APPARATUS MANAGEMENT METHOD

(71) Applicant: Huawei Technologies Co., Ltd., Shenzhen (CN)

(72) Inventors: Chongyang Wang, Beijing (CN); Zhigang Guo, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 296 days.

(21) Appl. No.: 14/720,630

(22) Filed: May 22, 2015

(65) Prior Publication Data

US 2015/0256487 A1 Sep. 10, 2015

Related U.S. Application Data

(63) Continuation of application No. PCT/CN2012/085294, filed on Nov. 26, 2012.

(51) Int. Cl.
*H04L 12/933* (2013.01)
*H04L 12/931* (2013.01)
(Continued)

(52) U.S. Cl.
CPC ........ *H04L 49/40* (2013.01); *H04L 12/40013* (2013.01); *H04L 49/15* (2013.01);
(Continued)

(58) Field of Classification Search
CPC ..... H04L 2012/5619; H04L 2012/5627; H04L 49/106; H04L 49/1576; H04L 12/56;
(Continued)

(56) References Cited

U.S. PATENT DOCUMENTS 6,639,895 B1 * 10/2003 Helles ................. H04L 12/5601
370/219
2004/0085985 A1 * 5/2004 Lebizay ................. H04M 7/006
370/419
(Continued)

FOREIGN PATENT DOCUMENTS

| CN | 101854282 A | 10/2010 |
|---|---|---|
| CN | 101984610 A | 3/2011 |
| CN | 102104532 A | 6/2011 |

OTHER PUBLICATIONS

Wikipedia, "Babbling Idiot," https://de.wikipedia.org/w/index.php?title=Babbling_idiot&oldid=159153562, retrieved Sep. 29, 2017, 2 pages.

*Primary Examiner* — Jae Y Lee
*Assistant Examiner* — Aixa A Guadalupe Cruz
(74) *Attorney, Agent, or Firm* — Slater Matsil, LLP

(57) ABSTRACT

A method for managing a connection apparatus and a connection apparatus are disclosed. In an embodiment the connection apparatus includes a first connector configured to be connected to a service processing unit, a second connector configured to be connected to a first switching unit, a third connector configured to be connected to a second switching unit, wherein the third connector is further configured to be disconnected from the second switching unit and connected to the first switching unit. The apparatus further comprises a first transmission medium, a second transmission medium, one end of the first transmission medium being directly connected to the first connector, one end of the second transmission medium being directly connected to the first connector, another end of the first transmission medium being directly connected to the second connector, and another end of the second transmission medium being directly connected to the third connector.

20 Claims, 6 Drawing Sheets

(51) Int. Cl.
  *H04L 12/40* (2006.01)
  *H04L 12/939* (2013.01)
  *H04L 12/54* (2013.01)
  *H04L 12/70* (2013.01)

(52) U.S. Cl.
  CPC .............. *H04L 49/55* (2013.01); *H04L 12/56* (2013.01); *H04L 49/1507* (2013.01); *H04L 49/1515* (2013.01); *H04L 49/1553* (2013.01); *H04L 2012/5627* (2013.01)

(58) Field of Classification Search
  CPC ............. H04L 49/1515; H04L 49/1523; H04L 49/351; H04L 12/40013; H04J 2203/0012; H04J 3/14; G06F 13/4022
  See application file for complete search history.

(56) References Cited

U.S. PATENT DOCUMENTS

| | | |
|---|---|---|
| 2006/0104271 A1 | 5/2006 | Samudra |
| 2010/0232425 A1 | 9/2010 | Niu et al. |

\* cited by examiner

CONNECTION APPARATUS AND CONNECTION APPARATUS MANAGEMENT METHOD

This application is a continuation of International Application No. PCT/CN2012/085294, filed on Nov. 26, 2012, which is hereby incorporated by reference in its entirety.

TECHNICAL FIELD

The present invention relates to the field of communications, and in particular, to a connection apparatus and a connection apparatus management method.

BACKGROUND

Network devices include routers and switches. For example, a router may include a backplane, a service processing unit, and a switching unit. The backplane is configured to connect the service processing unit and the switching unit. The service processing unit sends data to the switching unit through the backplane, and the switching unit processes the data.

In the prior art, a connection relationship between the service processing unit and the switching unit is fixed. A flexible configuration of the connection relationship between the service processing unit and the switching unit cannot be implemented.

SUMMARY

Embodiments of the present invention provide a connection apparatus and a connection apparatus management method, which can implement a flexible configuration of a connection relationship between a service processing unit and a switching unit.

Embodiments of the present invention may use the following technical solutions:

According to a first aspect, a connection apparatus management method is provided and includes disconnecting a third connector from a second switching unit, where the third connector is a connector in a connection apparatus, the connection apparatus includes a first connector, a second connector, the third connector, a first transmission medium, and a second transmission medium, one end of the first transmission medium is directly connected to the first connector, one end of the second transmission medium is directly connected to the first connector, another end of the first transmission medium is directly connected to the second connector, another end of the second transmission medium is directly connected to the third connector, the first connector is connected to a service processing unit, and the second connector is connected to a first switching unit; and connecting the third connector to the first switching unit.

In a first possible implementation manner of the connection apparatus management method provided in the first aspect, after the disconnecting the third connector from the second switching unit, the method further includes stopping supplying power to the second switching unit.

According to the connection apparatus management method provided in the first aspect or the first possible implementation manner of the connection apparatus management method provided in the first aspect, in a second possible implementation manner of the connection apparatus management method provided in the first aspect, before the disconnecting the third connector from the second switching unit, the method further includes connecting a fourth connector to the first switching unit, where the fourth connector is a connector in the connection apparatus, the connection apparatus includes the fourth connector and a third transmission medium, one end of the third transmission medium is directly connected to the first connector, and another end of the third transmission medium is directly connected to the fourth connector.

According to the connection apparatus management method provided in the first aspect, the first possible implementation manner of the connection apparatus management method provided in the first aspect, or the second possible implementation manner of the connection apparatus management method provided in the first aspect, in a third possible implementation manner of the connection apparatus management method provided in the first aspect, the first transmission medium or the second transmission medium is a cable, an optical fiber, or a flexible circuit board.

According to the connection apparatus management method provided in the first aspect, the first possible implementation manner of the connection apparatus management method provided in the first aspect, the second possible implementation manner of the connection apparatus management method provided in the first aspect, or the third possible implementation manner of the connection apparatus management method provided in the first aspect, in a fourth possible implementation manner of the connection apparatus management method provided in the first aspect, the service processing unit is an interface board or a subcard of an interface board.

According to a second aspect, a connection apparatus is provided and includes a first connector, a second connector, a third connector, a first transmission medium, and a second transmission medium, where one end of the first transmission medium is directly connected to the first connector, one end of the second transmission medium is directly connected to the first connector, another end of the first transmission medium is directly connected to the second connector, another end of the second transmission medium is directly connected to the third connector, the first connector is configured to connect a service processing unit, the second connector is configured to connect a first switching unit, and the third connector is configured to connect a second switching unit, where the third connector is further configured to disconnect the third connector from the second switching unit, and connect the third connector to the first switching unit.

In a first possible implementation manner of the connection apparatus provided in the second aspect, the connection apparatus further includes a fourth connector and a third transmission medium, where one end of the third transmission medium is directly connected to the first connector, and another end of the third transmission medium is directly connected to the fourth connector, where the fourth connector is configured to: before the third connector disconnects the third connector from the second switching unit, connect the fourth connector to the first switching unit.

According to the connection apparatus provided in the second aspect or the first possible implementation manner of the connection apparatus provided in the second aspect, in a second possible implementation manner of the connection apparatus provided in the second aspect, the first transmission medium or the second transmission medium is a cable, an optical fiber, or a flexible circuit board.

According to the connection apparatus provided in the second aspect or the first possible implementation manner of the connection apparatus provided in the second aspect, or the second possible implementation manner of the connection apparatus provided in the second aspect, in a third possible implementation manner of the connection apparatus provided in the second aspect, the service processing unit is an interface board or a subcard of an interface board.

According to a third aspect, a network apparatus is provided and includes the connection apparatus provided in the second aspect, or the connection apparatus provided in the first possible implementation manner of the connection apparatus provided in the second aspect or the third possible implementation manner of the connection apparatus provided in the second aspect.

In the foregoing technical solutions, by disconnecting the third connector from the second switching unit and connecting the third connector to the first switching unit, a flexible configuration of the connection relationship between the service processing unit and the switching unit is implemented.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
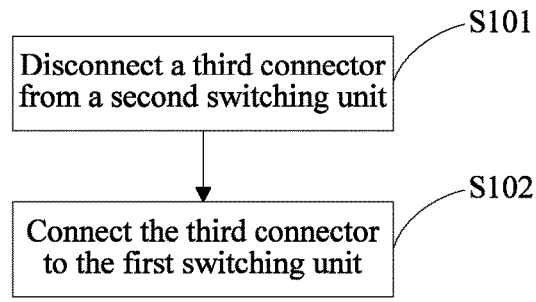
FIG. 1 is a flowchart of a connection apparatus management method according to an embodiment of the present invention.

An embodiment of the present invention provides a connection apparatus management method. As shown in FIG. 1, the method includes the following:

S101: Disconnect a third connector from a second switching unit.

The third connector is a connector in a connection apparatus. The connection apparatus includes a first connector, a second connector, the third connector, a first transmission medium, and a second transmission medium. One end of the first transmission medium is directly connected to the first connector. One end of the second transmission medium is directly connected to the first connector. Another end of the first transmission medium is directly connected to the second connector. Another end of the second transmission medium is directly connected to the third connector. The first connector is connected to a service processing unit. The second connector is connected to a first switching unit.

The service processing unit can execute a service. For example, the service may be processing a received packet according to a field in the received packet. The field may be information of the second layer to the seventh layer defined by an open systems interconnection model (Open Systems Interconnection model, OSI model).

For example, the service may be a network address translation (Network Address Translation, NAT) service, a carrier grade network address translation (Carrier Grade NAT, CGN) service, an Internet Protocol security (Internet Protocol Security, IPSEC) service, a video service, a firewall service, a uniform resource locator (Uniform/Universal Resource Locator, URL) filtering service, or a peer-to-peer (Peer-to-Peer, P2P) traffic visibility service. The video service may be a frame relay (Frame Relay, FR), a resolution enhancement technology (Resolution Enhancement Technology, RET), a multiple document interface (Multiple Document Interface, MDI), or a content delivery network (Content Delivery Network, CDN).

For example, the service may be a forwarding service or a committed access rate (committed access rate, CAR) service. If the service is a forwarding service, the forwarding service may be a layer-2 forwarding service, a layer-3 forwarding service, a multiprotocol label switching (multiprotocol label switching, MPLS) forwarding service, or a virtual private network (virtual private network, VPN) forwarding service.

For example, the service processing unit may be a line processing unit (line processing unit, LPU). The LPU may be an interface board in a router. The service processing unit may also be a subcard of the interface board.

The first switching unit can switch received data. The second switching unit can switch received data.

For example, the first switching unit may be a switch processing unit (switch processing unit, SPU). The SPU may be a switching board in a router. The first switching unit may also be a switch chip in the switching board.

For example, the second switching unit may be an SPU. The SPU may be a switching board in a router. The second switching unit may also be a switch chip in the switching board.

Figure 2:
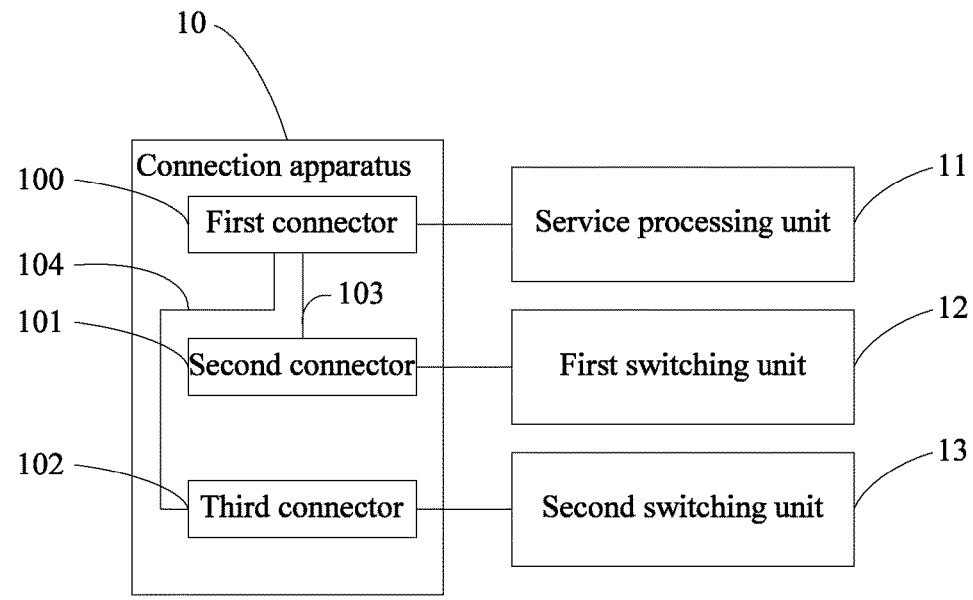
FIG. 2 is a schematic structural diagram of a connection apparatus according to an embodiment of the present invention.

FIG. 2 is a schematic structural diagram of a connection apparatus according to an embodiment of the present invention. Referring to FIG. 2, the connection apparatus 10 includes a first connector 100, a second connector 101, a third connector 102, a first transmission medium 103, and a second transmission medium 104. One end of the first transmission medium 103 is directly connected to the first connector 100. Another end of the first transmission medium 103 is directly connected to the second connector 101. One end of the second transmission medium 104 is directly connected to the first connector 100. Another end of the second transmission medium 104 is directly connected to the third connector 102. The first connector 100 is connected to a service processing unit 11. The second connector 101 is connected to a first switching unit 12. The third connector 102 is connected to the second switching unit 13.

S102: Connect the third connector to the first switching unit.

Figure 3:
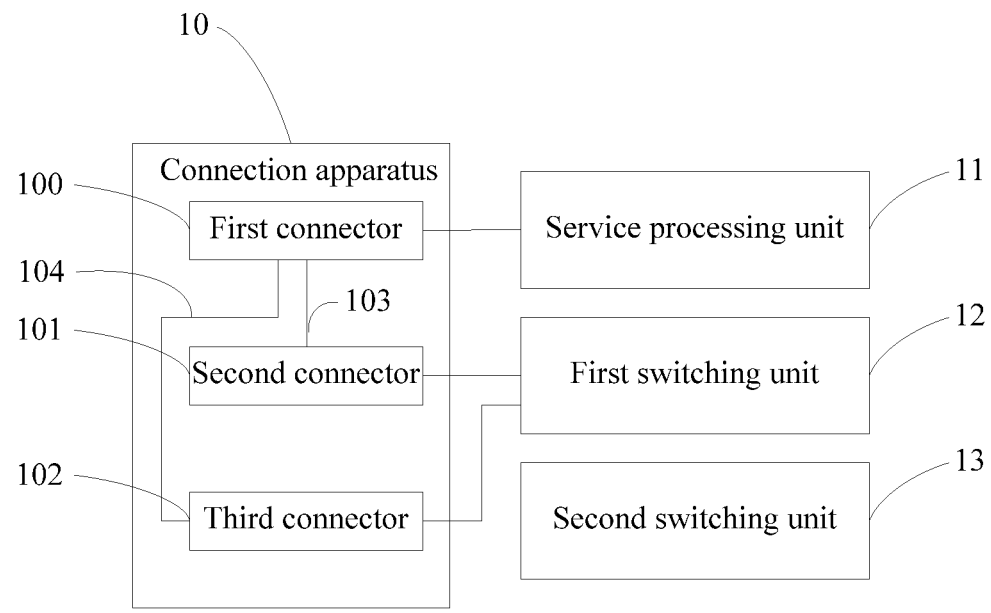
FIG. 3 is a schematic structural diagram of a connection apparatus according to an embodiment of the present invention.

A connection apparatus shown in FIG. 3 is obtained after the connection apparatus shown in FIG. 2 is processed in S101 and S102. Referring to FIG. 3, the third connector 102 is connected to the first switching unit 12.

In the foregoing technical solution, by disconnecting the third connector from the second switching unit and connecting the third connector to the first switching unit, a technical effect that both the second connector and the third connector are connected to the first switching unit is achieved. A flexible configuration of a connection relationship between the service processing unit and the switching unit is implemented. In addition, a person skilled in the art may understand that the foregoing technical solution may also be implemented without stopping supplying power to the service processing unit, the first switching unit, or the second switching unit.

Figure 4:
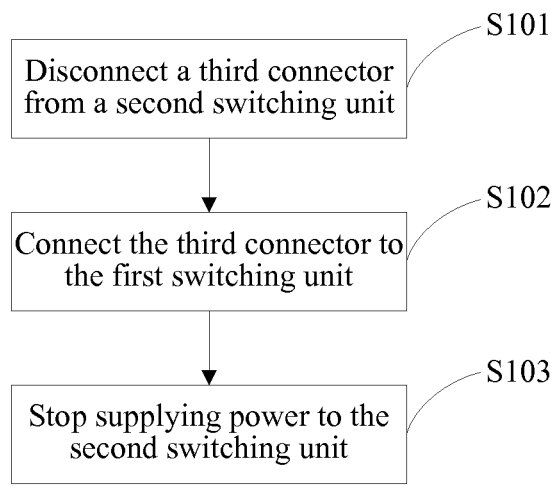
FIG. 4 is a flowchart of a connection apparatus management method according to an embodiment of the present invention.

Optionally, in the method shown in FIG. 1, after S101, the method may further include the following:

S103: Stop supplying power to the second switching unit. Step S103 is shown in FIG. 4.

It may be understood that, after the third connector is disconnected from the second switching unit, power consumption may be reduced by stopping supplying power to the second switching unit.

It should be noted that the sequence of S102 and S103 is not limited in the present invention. That is, it may be that S102 is executed first and then S103 is executed; or it may also be that S103 is executed first and then S102 is executed; and it may further be that S102 and S103 are executed simultaneously.

Optionally, in the method shown in FIG. 1, before S101, the method may further include the following:

S104: Connect a fourth connector to the first switching unit.

The fourth connector is a connector in the connection apparatus. The connection apparatus includes the fourth connector and a third transmission medium. One end of the third transmission medium is directly connected to the first connector, and another end of the third transmission medium is directly connected to the fourth connector.

Figure 5:
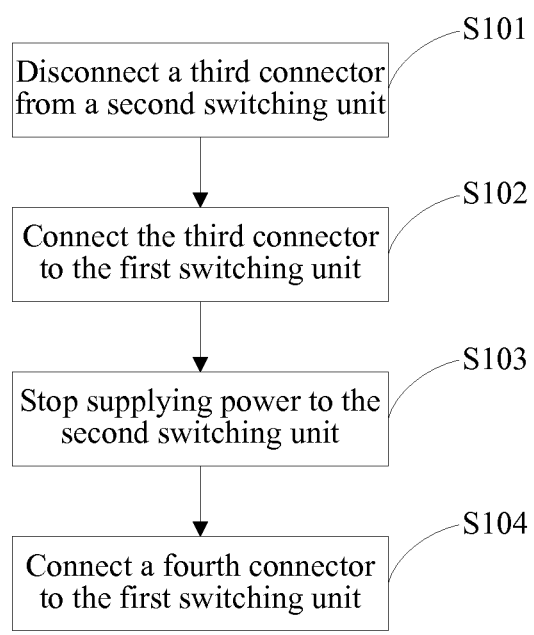
FIG. 5 is a flowchart of a connection apparatus management method according to an embodiment of the present invention.

Step S104 is shown in FIG. 5.

Figure 6:
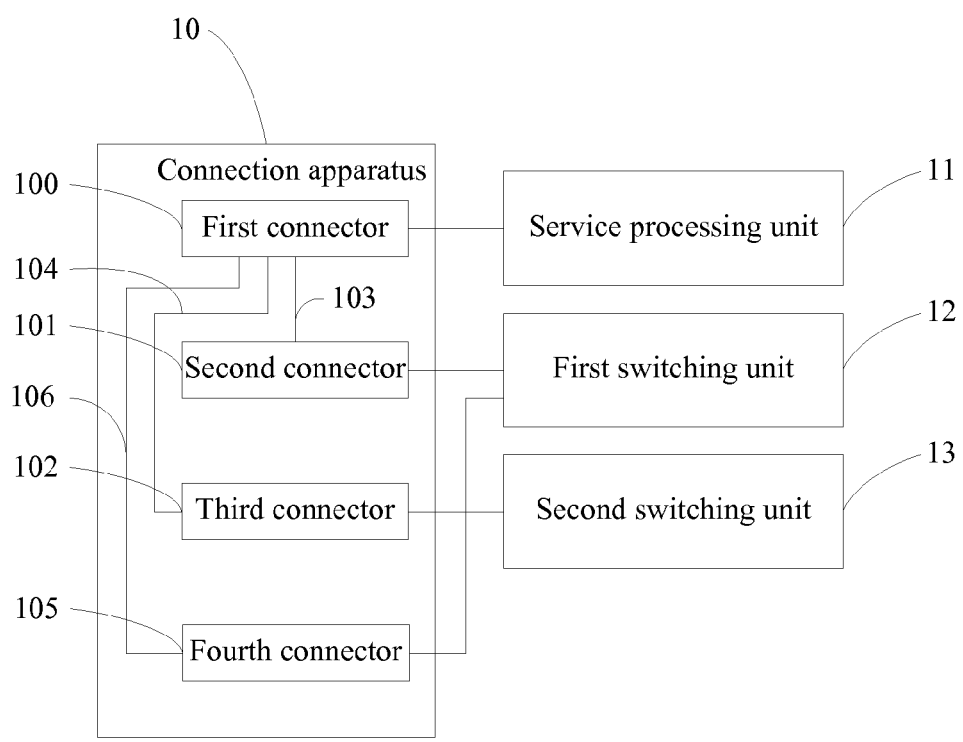
FIG. 6 is a schematic structural diagram of a connection apparatus according to an embodiment of the present invention.

FIG. 6 is a schematic structural diagram of a connection apparatus. Referring to FIG. 6 and FIG. 2, the connection apparatus shown in FIG. 6 may be obtained by adding a fourth connector 105 and a third transmission medium 106 to the connection apparatus shown in FIG. 2. Referring to FIG. 6, one end of the third transmission medium 106 is directly connected to the first connector 100, and another end of the third transmission medium 106 is directly connected to the fourth connector 105.

A person skilled in the art may understand that the following technical effect may be achieved if the fourth connector is connected to, before the third connector is disconnected from the second switching unit, the first switching unit: The fourth connector is connected to the first switching unit within a period of time between S101 and S102. Decrease of a switching capability caused by execution of S101 may be reduced. Surely, after S102, the fourth connector may also be disconnected from the first switching unit.

Optionally, in the method shown in FIG. 1, the first transmission medium or the second transmission medium may be a cable, an optical fiber, or a flexible circuit board.

Optionally, in the method shown in FIG. 5, the third transmission medium may also be a cable, an optical fiber, or a flexible circuit board.

It should be noted that the first transmission medium, the second transmission medium, and the third transmission medium may all be a cable, or may all be an optical fiber, or may all be a flexible circuit board, or may also be a combination of any two or three of a cable, an optical fiber, and a flexible circuit board. This is not limited by the present invention.

Optionally, the first transmission medium, the second transmission medium, or the third transmission medium may use different manufacturing materials and processes to improve a data transmission rate of the transmission medium. Further, in a case in which the number of service processing units, the number of switching units, and the number of connection apparatus do not change, the data transmission rate and a bandwidth of the connection apparatus may be improved by replacing the first transmission medium, the second transmission medium, or the third transmission medium so that the data transmission rate and the bandwidth are upgraded.

FIG. 2 is a schematic structural diagram of a connection apparatus according to an embodiment of the present invention. The connection apparatus may be configured to execute the method shown in FIG. 1. Referring to FIG. 2, the connection apparatus 10 includes a first connector 100, a second connector 101, a third connector 102, a first transmission medium 103, and a second transmission medium 104. One end of the first transmission medium 103 is directly connected to the first connector 100. One end of the second transmission medium 104 is directly connected to the first connector 100. Another end of the first transmission medium 103 is directly connected to the second connector 101. Another end of the second transmission medium 104 is directly connected to the third connector 102. The first connector 100 is configured to connect a service processing unit 11. The second connector 101 is configured to connect a first switching unit 12. The third connector 102 is configured to connect a second switching unit 13.

The third connector 102 is further configured to disconnect the third connector 102 from the second switching unit 13, and connect the third connector 102 to the first switching unit 12.

The service processing unit can execute a service. For example, the service may be processing a received packet according to a field in the received packet. The field may be information of the second layer to the seventh layer defined by an OSI model.

For example, the service may be a NAT service, a CGN service, an IPSEC service, a video service, a firewall service, a URL filtering service, or a P2P traffic visibility service. The video service may be an FR, a RET, an MDI, or a CDN.

For example, the service may be a forwarding service or a CAR service. If the service is a forwarding service, the forwarding service may be a layer-2 forwarding service, a layer-3 forwarding service, an MPLS forwarding service, or a VPN forwarding service.

For example, the service processing unit may be an LPU. The LPU may be an interface board in a router. The service processing unit may also be a subcard of the interface board.

The first switching unit can switch received data. The second switching unit can switch received data.

For example, the first switching unit may be an SPU. The SPU may be a switching board in a router. The first switching unit may also be a switch chip in the switching board.

For example, the second switching unit may be an SPU. The SPU may be a switching board in a router. The second switching unit may also be a switch chip in the switching board.

Optionally, as shown in FIG. 6, the connection apparatus 10 shown in FIG. 2 further includes a fourth connector 105 and a third transmission medium 106. One end of the third transmission medium 106 is directly connected to the first connector 100, and another end of the third transmission medium 106 is directly connected to the fourth connector 105.

The fourth connector 105 is configured to: before the third connector 102 disconnects the third connector 102 from the second switching unit 13, connect the fourth connector 105 to the first switching unit 12.

A person skilled in the art may understand that the following technical effect may be achieved if the fourth connector 105 is connected to, before the third connector 102 is disconnected from the second switching unit 13, the first switching unit 12: The fourth connector 105 is connected to the first switching unit 12 within a period of time after the third connector 102 is disconnected from the second switching unit 13 and before the third connector 102 is connected to the first switching unit 12. Decrease of a switching capability caused by disconnecting the third connector 102 from the second switching unit 13 may be reduced. Surely, after the third connector 102 is connected to the first switching unit 12, the fourth connector 105 may also be disconnected from the first switching unit 12.

Optionally, in the connection apparatus shown in FIG. 2, the first transmission medium 103 or the second transmission medium 104 may be a cable, an optical fiber, or a flexible circuit board.

Optionally, in the connection apparatus shown in FIG. 6, the third transmission medium 106 may also be a cable, an optical fiber, or a flexible circuit board.

It should be noted that, the first transmission medium 103, the second transmission medium 104, and the third transmission medium 106 may all be a cable, or may all be an optical fiber, or may all be a flexible circuit board, or may also be a combination of any two or three of a cable, an optical fiber, and a flexible circuit board. This is not limited by the present invention.

Optionally, the first transmission medium 103, the second transmission medium 104, or the third transmission medium 106 may use different manufacturing materials and processes to improve a data transmission rate of the transmission medium. Further, in a case in which the number of service processing units 11, the number of first switching units 12, the number of second switching units 13, and the number of connection apparatus 10 do not change, the data transmission rate and a bandwidth of the connection apparatus 10 may be improved by replacing the first transmission medium 103, the second transmission medium 104, or the third transmission medium 106, so that the data transmission rate and the bandwidth of a whole network device are upgraded.

In the foregoing technical solution, by disconnecting the third connector from the second switching unit and connecting the third connector to the first switching unit, a technical effect that both the second connector and the third connector are connected to the first switching unit is achieved. A flexible configuration of a connection relationship between the service processing unit and the switching unit is implemented. In addition, a person skilled in the art may understand that the foregoing technical solution may also be implemented without stopping supplying power to the service processing unit, the first switching unit, or the second switching unit.

An embodiment of the present invention further provides a network device, including a connection apparatus 10, a service processing unit 11, a first switching unit 12, and a second switching unit 13 shown in FIG. 2.

As shown in FIG. 2, the connection apparatus 10 includes a first connector 100, a second connector 101, a third connector 102, a first transmission medium 103, and a second transmission medium 104. One end of the first transmission medium 103 is directly connected to the first connector 100. One end of the second transmission medium 104 is directly connected to the first connector 100. Another end of the first transmission medium 103 is directly connected to the second connector 101. Another end of the second transmission medium 104 is directly connected to the third connector 102. The first connector 100 is configured to connect the service processing unit 11. The second connector 101 is configured to connect the first switching unit 12. The third connector 102 is configured to connect the second switching unit 13. The third connector 102 is further configured to disconnect the third connector 102 from the second switching unit 13, and connect the third connector 102 to the first switching unit 12.

The network device may be a router, a switch, a firewall, or a load balancer.

Figure 7:
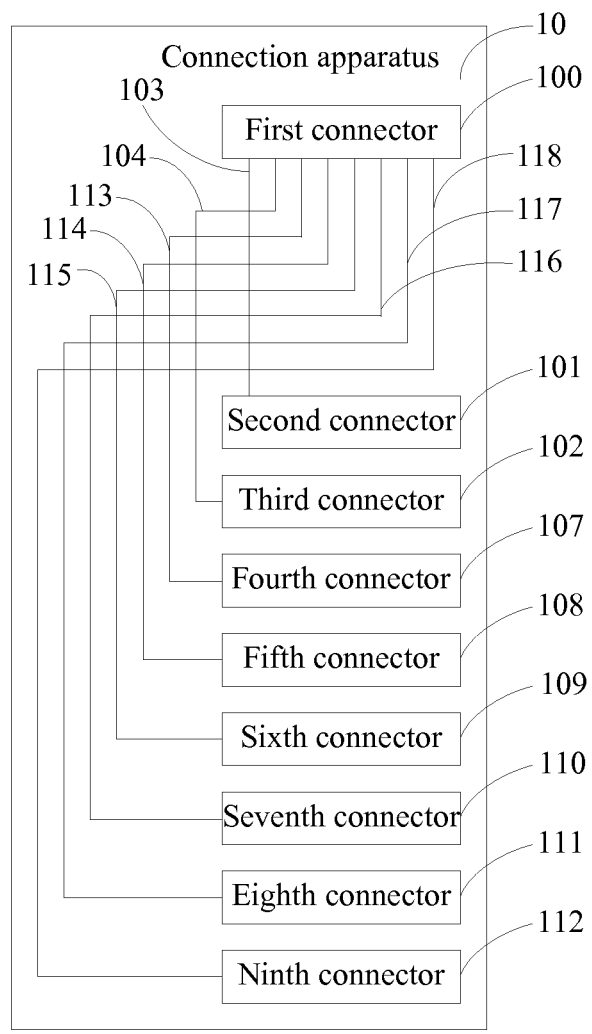
FIG. 7 is a schematic structural diagram of a connection apparatus according to an embodiment of the present invention.
Figure 8:
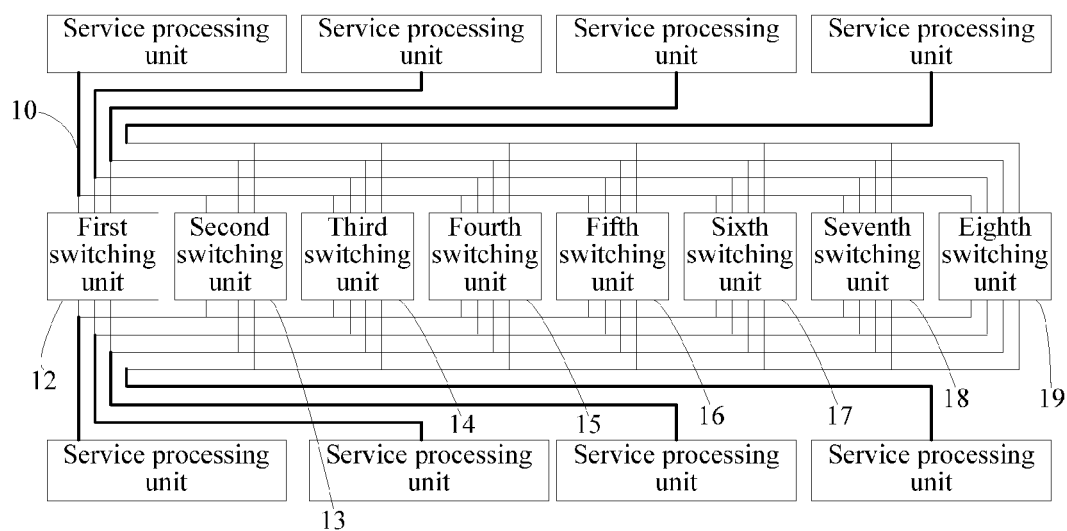
FIG. 8 is a schematic structural diagram of a network apparatus according to an embodiment of the present invention.

FIG. 8 is a schematic structural diagram of a network device according to an embodiment of the present invention. Referring to FIG. 8, the network device includes eight service processing units and eight switching units. The eight service processing units are connected to the eight switching units in a full mesh (full mesh) manner. Eight connection apparatuses 10 shown in FIG. 7 may be used to connect the eight service processing units to the eight switching units. The eight connection apparatuses 10 have a one-to-one correspondence with the eight service processing units.

As shown in FIG. 8, the eight switching units are respectively a first switching unit 12, a second switching unit 13, a third switching unit 14, a fourth switching unit 15, a fifth switching unit 16, a sixth switching unit 17, a seventh switching unit 18, and an eighth switching unit 19.

A shown in FIG. 7, each connection apparatus 10 among the eight connection apparatuses includes a first connector 100, a second connector 101, a third connector 102, a fourth connector 107, a fifth connector 108, a sixth connector 109, a seventh connector 110, an eighth connector 111, a ninth connector 112, a first transmission medium 103, a second transmission medium 104, a third transmission medium 113, a fourth transmission medium 114, a fifth transmission medium 115, a sixth transmission medium 116, a seventh transmission medium 117, and an eighth transmission medium 118. One end of the first transmission medium 103 is directly connected to the first connector 100. One end of the second transmission medium 104 is directly connected to the first connector 100. One end of the third transmission medium 113 is directly connected to the first connector 100. One end of the fourth transmission medium 114 is directly connected to the first connector 100. One end of the fifth transmission medium 115 is directly connected to the first connector 100. One end of the sixth transmission medium 116 is directly connected to the first connector 100. One end of the seventh transmission medium 117 is directly connected to the first connector 100. One end of the eighth transmission medium 118 is directly connected to the first connector 100. Another end of the first transmission medium 103 is directly connected to the second connector 101. Another end of the second transmission medium 104 is directly connected to the third connector 102. Another end of the third transmission medium 113 is directly connected to the fourth connector 107. Another end of the fourth transmission medium 114 is directly connected to the fifth connector 108. Another end of the fifth transmission medium 115 is directly connected to the sixth connector 109. Another end of the sixth transmission medium 116 is directly connected to the seventh connector 110. Another end of the seventh transmission medium 117 is directly connected to the eighth connector 111. Another end of the eighth transmission medium 118 is directly connected to the ninth connector 112.

A person skilled in the art may clearly understand that, for convenience and brevity of description, only division of the foregoing functional modules is used as an example for description. In an actual application, the foregoing functions may be allocated to different functional modules for completion according to a requirement, that is, an internal structure of the device is divided into different functional modules for completing all or a part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for managing a connection apparatus, the method comprising:
    disconnecting a third connector from a second apparatus, the second apparatus comprising a first switching board in a first router, or a first switch chip in the first router, wherein the third connector is a connector in a connection apparatus; and
    connecting the third connector to a first apparatus, the first apparatus comprising a second switching board in a second router, or a second switch chip in the second router, wherein a previous connection of a second connector to the first apparatus is maintained when the third connector is connected to the first apparatus, the connection apparatus comprising the second connector;
    wherein the connection apparatus comprises:
        a first connector, the first connector being connected to an interface board in a third router, or to a subcard of the interface board in the third router, wherein the interface board or the subcard is configured to process a received packet according to a field in the received packet,
        the second connector,
        the third connector,
        a first transmission medium, and
        a second transmission medium;
    wherein one end of the first transmission medium is directly connected to the first connector;
    wherein one end of the second transmission medium is directly connected to the first connector;
    wherein another end of the first transmission medium is directly connected to the second connector; and
    wherein another end of the second transmission medium is directly connected to the third connector.

2. The method according to claim 1, further comprising, after disconnecting the third connector from the second apparatus, stopping supplying power to the second apparatus.

3. The method according to claim 1, further comprising, before disconnecting the third connector from the second apparatus, connecting a fourth connector to the first apparatus, wherein the fourth connector is a connector in the connection apparatus, the connection apparatus further comprising:
    the fourth connector and a third transmission medium;
    wherein one end of the third transmission medium is directly connected to the first connector; and
    wherein another end of the third transmission medium is directly connected to the fourth connector.

4. The method according to claim 1, wherein the first transmission medium or the second transmission medium is a cable, an optical fiber, or a flexible circuit board.

5. The method according to claim 1, wherein the first router, the second router and the third router are a same router.

6. The method according to claim 1, wherein the first router, the second router and the third router are different routers.

7. The method according to claim 1, wherein the first transmission medium and the second transmission medium comprise different manufacturing materials.

8. A connection apparatus, comprising:
a first connector configured to be connected to an interface board in a first router, or to a subcard of the interface board in the first router, wherein the interface board or the subcard is configured to process a received packet according to a field in the received packet;
a second connector configured to be connected to a first apparatus, the first apparatus comprising a first switching board in a second router, or a first switch chip in the second router;
a third connector configured to be connected to a second apparatus, the second apparatus comprising a second switching board in a third router, or a second switch chip in the third router, wherein the third connector is further configured to be disconnected from the second apparatus and connected to the first apparatus, and wherein a previous connection of the second connector to the first apparatus is maintained when the third connector is connected to the first apparatus;
a first transmission medium; and
a second transmission medium;
wherein one end of the first transmission medium is directly connected to the first connector;
wherein one end of the second transmission medium is directly connected to the first connector;
wherein another end of the first transmission medium is directly connected to the second connector; and
wherein another end of the second transmission medium is directly connected to the third connector.

9. The connection apparatus according to claim 8, further comprising a fourth connector and a third transmission medium, wherein one end of the third transmission medium is directly connected to the first connector, and another end of the third transmission medium is directly connected to the fourth connector, and wherein the fourth connector is configured to be connected to the first apparatus before the third connector is disconnected from the second apparatus.

10. The connection apparatus according to claim 8, wherein the first transmission medium or the second transmission medium is a cable, an optical fiber, or a flexible circuit board.

11. The connection apparatus according to claim 8, wherein the first router, the second router and the third router are a same router.

12. The connection apparatus according to claim 8, wherein the first router, the second router and the third router are different routers.

13. The connection apparatus according to claim 8, wherein disconnecting the third connector from the second apparatus further comprises:
stopping supplying power to the second apparatus.

14. The connection apparatus according to claim 8, wherein the first transmission medium and the second transmission medium comprise different manufacturing materials.

15. A connection apparatus, comprising:
a first connector configured to be connected to an interface board in a first router, or to a subcard of the interface board in the first router, wherein the interface board or the subcard is configured to process a received packet according to a field in the received packet;
a second connector configured to be connected to a first apparatus, the first apparatus comprising a first switching board in a second router, or a first switch chip in the second router;
a third connector configured to be connected to a second apparatus, the second apparatus comprising a second switching board in a third router, or a second switch chip in the third router, wherein the third connector is further configured to be disconnected from the second apparatus and connected to the first apparatus, a supply of power to the second apparatus being stopped in response to disconnecting the third connector from the second apparatus, and wherein a previous connection of the second connector to the first apparatus is maintained when the third connector is connected to the first apparatus;
a first transmission medium; and
a second transmission medium;
wherein one end of the first transmission medium is directly connected to the first connector;
wherein one end of the second transmission medium is directly connected to the first connector;
wherein another end of the first transmission medium is directly connected to the second connector; and
wherein another end of the second transmission medium is directly connected to the third connector.

16. The connection apparatus of claim 15, further comprising a fourth connector and a third transmission medium, wherein one end of the third transmission medium is directly connected to the first connector, and another end of the third transmission medium is directly connected to the fourth connector, and wherein the fourth connector is configured to be connected to the first apparatus before the third connector is disconnected from the second apparatus.

17. The connection apparatus according to claim 15, wherein the first transmission medium or the second transmission medium is a cable, an optical fiber, or a flexible circuit board.

18. The connection apparatus according to claim 15, wherein the first router, the second router and the third router are a same router.

19. The connection apparatus according to claim 15, wherein the first router, the second router and the third router are different routers.

20. The connection apparatus according to claim 15, wherein the first transmission medium and the second transmission medium comprise different manufacturing materials.

* * * * *